United States Patent
Feroli et al.

(10) Patent No.: US 7,214,888 B1
(45) Date of Patent: May 8, 2007

(54) ADAPTIVE ELECTROMAGNETIC INTERFERENCE-RADIO FREQUENCY INTERFERENCE (EMI/RFI) SHIELD EXTENSION

(75) Inventors: Lawrence J. Feroli, W. Townsend, MA (US); Albert F. Beinor, Jr., Sutton, MA (US); C. Ilhan Gundogan, Lexington, MA (US); W. Brian Cunningham, Westborough, MA (US); Michael J. Kozel, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/393,338

(22) Filed: Mar. 30, 2006

(51) Int. Cl.
    *H01R 4/00* (2006.01)
(52) U.S. Cl. .................... 174/365; 361/686; 174/370
(58) Field of Classification Search ............... 174/260, 174/365, 370; 361/816, 818, 686, 799, 800
    See application file for complete search history.

(56) References Cited

U.S. PATENT DOCUMENTS

| | | | |
|---|---|---|---|
| 5,579,210 A | * | 11/1996 | Ruhland et al. ........... 361/816 |
| 6,114,622 A | * | 9/2000 | Draeger ..................... 174/384 |
| 6,424,521 B1 | * | 7/2002 | Vega et al. ................ 361/683 |
| 6,618,271 B1 | * | 9/2003 | Erickson et al. ........... 361/818 |
| 6,961,235 B2 | * | 11/2005 | Chen ......................... 361/683 |

* cited by examiner

*Primary Examiner*—Hung V. Ngo
(74) *Attorney, Agent, or Firm*—Guerin & Rodriguez, LLP; Michael A. Rodriguez

(57) ABSTRACT

Described is an adaptable electromagnetic interference and radio frequency interference (EMI/RFI) shield adapted to reduce unwanted EMI/RFI at an electrically conductive equipment panel having an elongated aperture. The aperture provides external access to a mounting bracket of an expansion board assembly. The mounting bracket (e.g., for a PCI expansion board) abuts an interior surface of the equipment panel at the elongated aperture and includes an angled flange extending through the elongated aperture. The EMI/RFI shield includes an electrically conductive shield extension slidable between open and closed positions. The shield extension includes a flange receptacle for receiving the angled flange of the mounting bracket and a shielding plate. The shielding plate overlaps an adjustable portion of the elongated aperture such that in a closed position the shielding plate together with the mounting bracket cover substantially the entire elongated aperture.

20 Claims, 10 Drawing Sheets

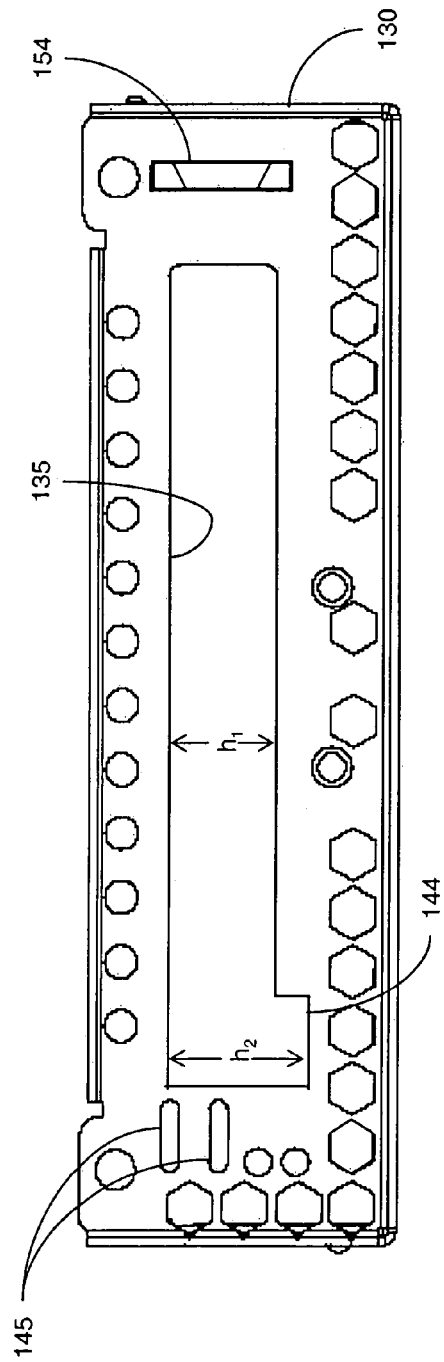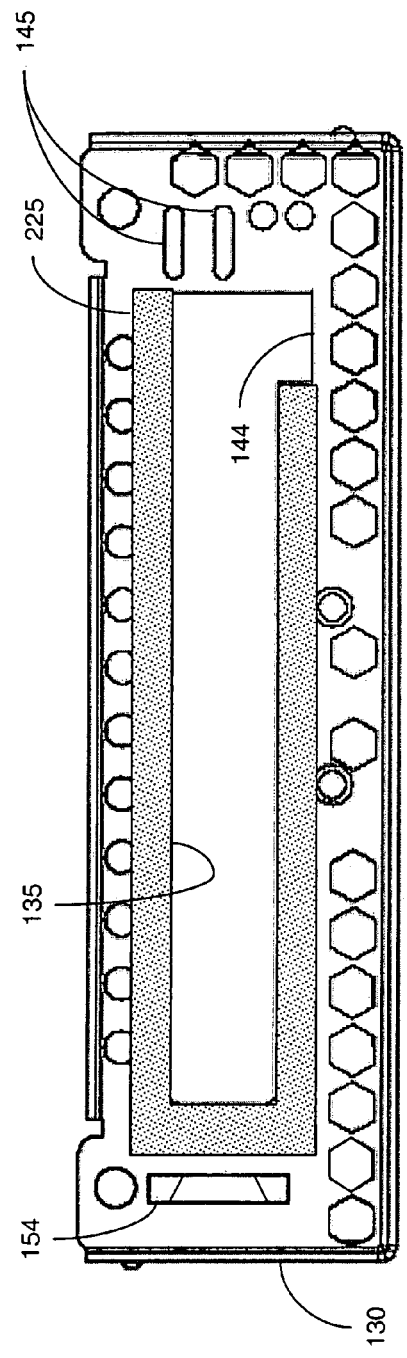
FIG. 4A
FIG. 4B

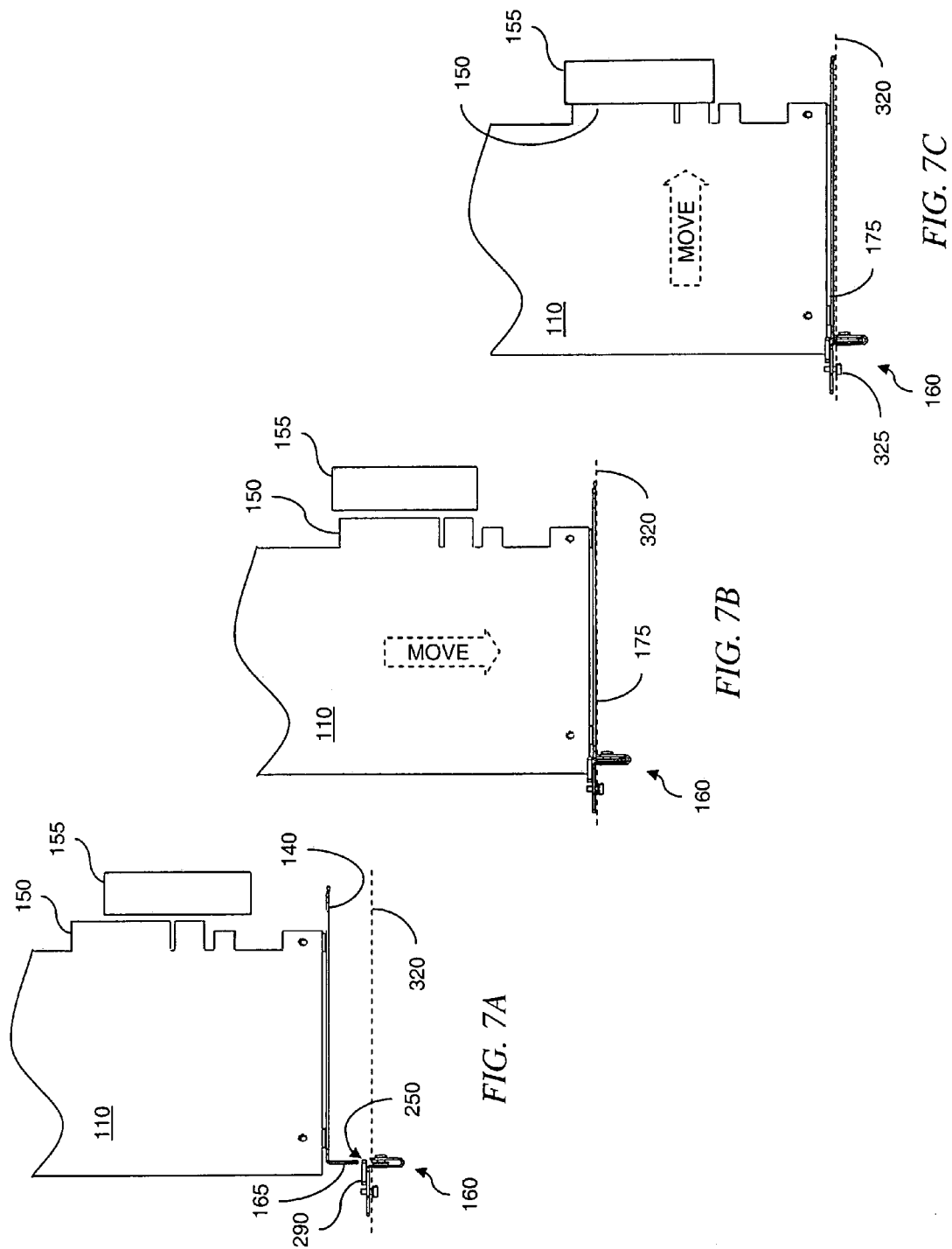

ADAPTIVE ELECTROMAGNETIC INTERFERENCE-RADIO FREQUENCY INTERFERENCE (EMI/RFI) SHIELD EXTENSION

FIELD OF THE INVENTION

The invention relates generally to an electromagnetic interference or radio frequency interference (EMI/RFI) shielding arrangement for enclosures housing electrical equipment. More particularly, the invention relates to EMI/RFI shielding for apertures in panels of such enclosures.

BACKGROUND

Some electronic devices emit electromagnetic radiation. To prevent deleterious interference of electromagnetic radiation upon other electronic equipment, limits are placed on the permissible amount of electromagnetic emissions from electronics equipment enclosures housing electronic devices. To comply with these limits, enclosures are typically sealed and made of an electrically conductive material (i.e., shielded). Invariably, one or more apertures are provided for accessing the electronic devices or boards housed therein. To prevent such EMI/RFI leakage at these apertures, an electrically conductive seal is needed to preserve the shielding integrity of the equipment enclosure.

Modular design approaches incorporate replaceable plug-in modules that can enhance or otherwise adapt features of a given electronics equipment enclosure. A modular design is particularly advantageous when plug-in modules are widely available. One class of such widely available modules conforms to a standardized form factor known as the Peripheral Component Interface (PCI) form factor. These PCI modules are often used in applications to provide customizable features, such as communication interfaces, to an equipment enclosure.

Some plug-in modules, including those subscribing to a PCI form factor, include an electrically conductive mounting bracket attached along an outer edge of a printed circuit board. The mounting bracket serves as a mechanism by which the plug-in module may be secured to a panel of the electronics enclosure after the plug-in module is seated therein. Usually, the mounting bracket has ports through which external devices can communicate with the printed circuit board. For the ports of the mounting bracket to be externally accessible, the mounting bracket is typically secured to an exterior panel of the electronics enclosure. The exterior panel has a slot-shaped aperture dimensioned to accommodate the mounting bracket. After being attached to the exterior panel, the electrically conductive mounting bracket should seal the slot-shaped aperture to prevent electromagnetic radiation from escaping the electronics enclosure.

In addition, the printed circuit board of the plug-in module usually has an edge-style or a finger-style connector, for mating with a connector within the electronics enclosure. Depending upon the location of the connector in the electronics enclosure, the mounting bracket may need to be moved within the electronics enclosure in order for the connector of the printed circuit board to mate with the connector of the electronics enclosure. However, many standard mounting brackets, including those used with PCI plug-in modules, have a perpendicularly angled flange; and this flange projects through the slot-shaped aperture. To accommodate the outwardly projecting flange while being able to move the printed circuit board to mate the connectors, the slot-shaped aperture may need to be larger than the mounting bracket. Accordingly, when the connectors of the printed circuit board and electronics enclosure mate, an uncovered section of the slot-shaped aperture may remain through which electromagnetic radiation can leak.

SUMMARY

In one aspect, the invention features an electronics enclosure comprising an electrically conductive exterior panel having an elongated aperture formed therein and an expansion board assembly with a mounting bracket coupled to the exterior panel to cover a first portion of the elongated aperture. The coupled mounting bracket has an angled flange that protrudes through the elongated aperture. An electrically conductive shield extension has a flange receptacle and a shielding plate extending from one end of the flange receptacle. The shield extension is coupled to the mounting bracket with the flange receptacle receiving the angled flange and with the shielding plate covering a second portion of the elongated aperture. The mounting bracket and shield extension fully cover the elongated aperture in the exterior panel of the electronics enclosure.

In another aspect, the invention features an adaptable electromagnetic interference/radio frequency interference (EMI/RFI) shield comprising a mounting bracket dimensioned to cover a first portion of an elongated aperture in an exterior panel of an electronics enclosure. The mounting bracket has an angled flange protruding through the elongated aperture when the mounting bracket is coupled to the exterior panel. An electrically conductive shield extension has a flange receptacle and a shielding plate extending from one end of the flange receptacle. The shield extension is coupled to the mounting bracket with the flange receptacle receiving the angled flange. The shielding plate is dimensioned to cover a second portion of the elongated aperture so that the mounting bracket and shield extension fully cover the elongated aperture in the exterior panel of the electronics enclosure aperture when the mounting bracket is coupled to the exterior panel.

In another aspect, the invention features a method for installing an expansion board assembly into an electromagnetic interference/radio frequency interference (EMI/RFI) shielded electronics enclosure. The method includes coupling a flange receptacle of a EMI/RFI shield extension to an angled flange of a mounting bracket that extends along an edge of the expansion board assembly. The EMI/RFI shield extension and the mounting bracket are slidably coupled to an exterior panel of the electronics enclosure such that the flange receptacle and angled flange protrude through an elongated aperture in the exterior panel. The EMI/RFI shield extension and mounting bracket are slid along a length of the exterior panel until a connector on the electronic board assembly mates with a connector in the electronics enclosure. When the connectors mate, the mounting bracket and the EMI/RFI shield extension substantially cover the elongated aperture in the exterior panel.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 4A is an exterior view of a front panel of the electronics enclosure of FIG. 1.

FIG. 4B is an interior view of the front panel of the electronics enclosure of FIG. 1.

FIG. 7A, FIG. 7B, and FIG. 7C provide a sequence of top views of a portion of the expansion board assembly of FIG. 2 illustrating the relative positions and motions of the different components during insertion of the expansion board assembly into the electronics enclosure of FIG. 1.

DETAILED DESCRIPTION

Figure 1:
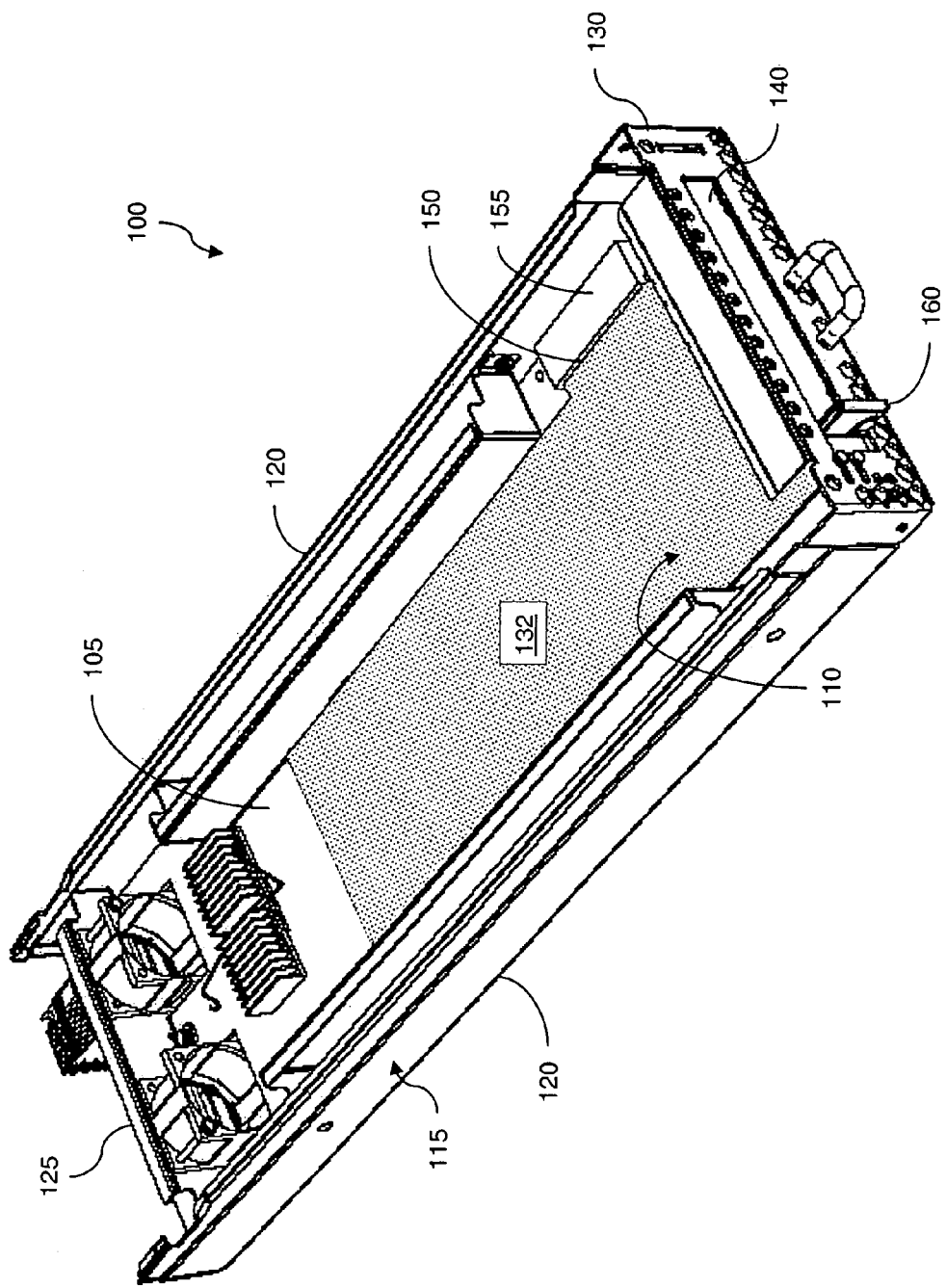
FIG. 1 is a top-perspective view of an embodiment of an electronics enclosure with an EMI/RFI shield extension constructed in accordance with the invention.

FIG. 1 shows a top-perspective view of an embodiment of an electronics enclosure 100 constructed in accordance with the invention. The electronics enclosure 100 includes an electrically conductive chassis 115 having electronic circuitry 105 (hereinafter a host circuit board), and an expansion board assembly 10 housed therein. In some embodiments, the chassis 115 may house other devices, including other circuit boards, modules, components, and cooling devices. Being electrically conductive, the chassis 115 provides an electrically conductive EMI/RFI shield to the electronic devices housed therein. An important aspect to controlling EMI/RFI is to limit or eliminate any gaps through the shielded chassis 115. The chassis 115 includes left and right side panels 120, a bottom panel (not visible in this view), a rear panel 125, and a front panel 130. Also included is a top panel, which is not shown to reveal the interior details.

The expansion board assembly 110 includes a printed circuit board 132 coupled to a mounting bracket 140 along an outer edge (here a front-facing edge) of the printed circuit board 132. The expansion board assembly 110 also includes a finger connector 150 disposed along a different edge of the printed circuit board 132 (here a right side edge). The finger connector 150 is positioned to mate with an expansion board connector, or expansion slot 155, when the printed circuit board 132 is disposed in parallel alignment above the host circuit board 105 and when the mounting bracket 140 is aligned with the front panel 130.

The front panel 130 defines an elongated aperture 135 (FIG. 4A) through which a portion of the mounting bracket 140 is accessible. Also shown is a shield extension 160 disposed at one end of the elongated aperture 135 and partially visible therethrough from the front panel 130. The shield extension 160 and the mounting bracket 140 together cover the elongated aperture 135 to preserve the EMI/RFI shield of the chassis 115 as described below.

The electronics enclosure 100 may function as a stand-alone device or as a sub-assembly of a larger system. In one exemplary embodiment, the electronics enclosure 100 is an input/output (I/O) processor that provides I/O functionality for an electronic system, such as a data storage system. The expansion board assembly 110 is removable and interchangeable. Thus, the electronics enclosure 100 can be said to have a modular design. The host circuit board 105 can include, for example, an I/O processor, with the expansion board assembly 110 providing a host bus adapter (HBA) to the I/O processor according to a defined standard, such as the Fibre Channel and INFINIBAND® standards.

Figure 2:
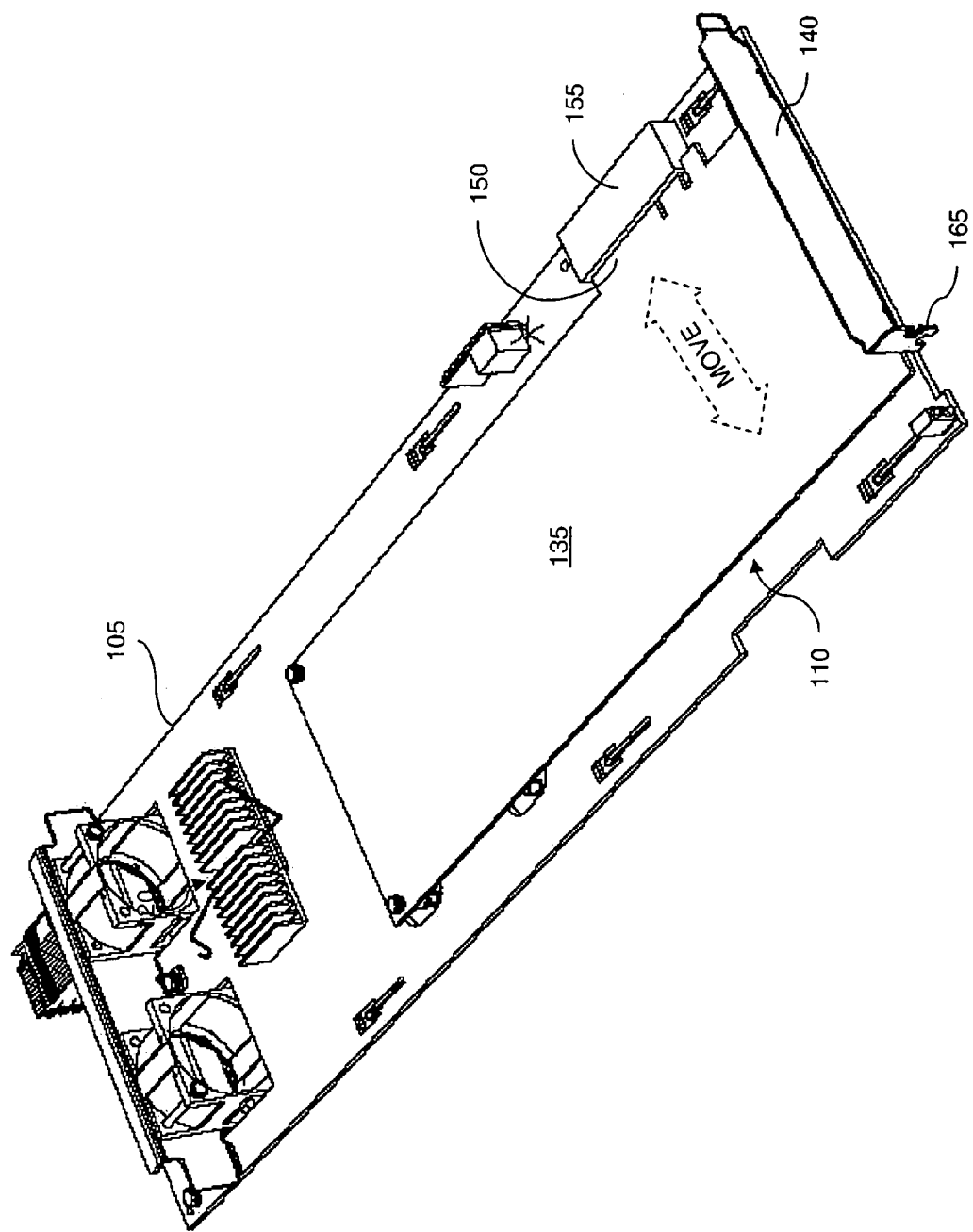
FIG. 2 is a perspective view of an expansion board assembly including a mounting bracket.

FIG. 2 shows a perspective view of the expansion board assembly 110 coupled to the host circuit board 105. The chassis 115 has been removed to more clearly illustrate the juxtaposition of the two printed circuit boards 105, 132. In particular, the expansion board assembly 110 is shown in a "seated" position in which its finger connector 150 is aligned with and inserted into the expansion slot 155 of the host circuit board 105. An arrow, shown in phantom, indicates the direction in which the expansion board assembly travels between the seated and unseated positions. Also shown is the mounting bracket 140 coupled to a front edge of the printed circuit board 132 and including an angled flange 165 at one end. The angled flange 165 extends away from the printed circuit board 132.

In one embodiment, the expansion board assembly 110 adheres to a standardized form factor. A form factor may define the physical dimensions of the expansion board assembly 110 and the number, type, and locations of any interfaces. Some standard form factors widely used throughout the computer industry include the Peripheral Component Interface (PCI) form factor. PCI refers to a local-bus standard that was created to provide a high-speed interconnect for peripheral devices. Other standard form factors include Versa Module Europa (VME), known as the "Eurocard form factor," PXI (PCI extensions for Instrumentation), and VXI (VMEbus extensions for Instrumentation).

Figure 3:
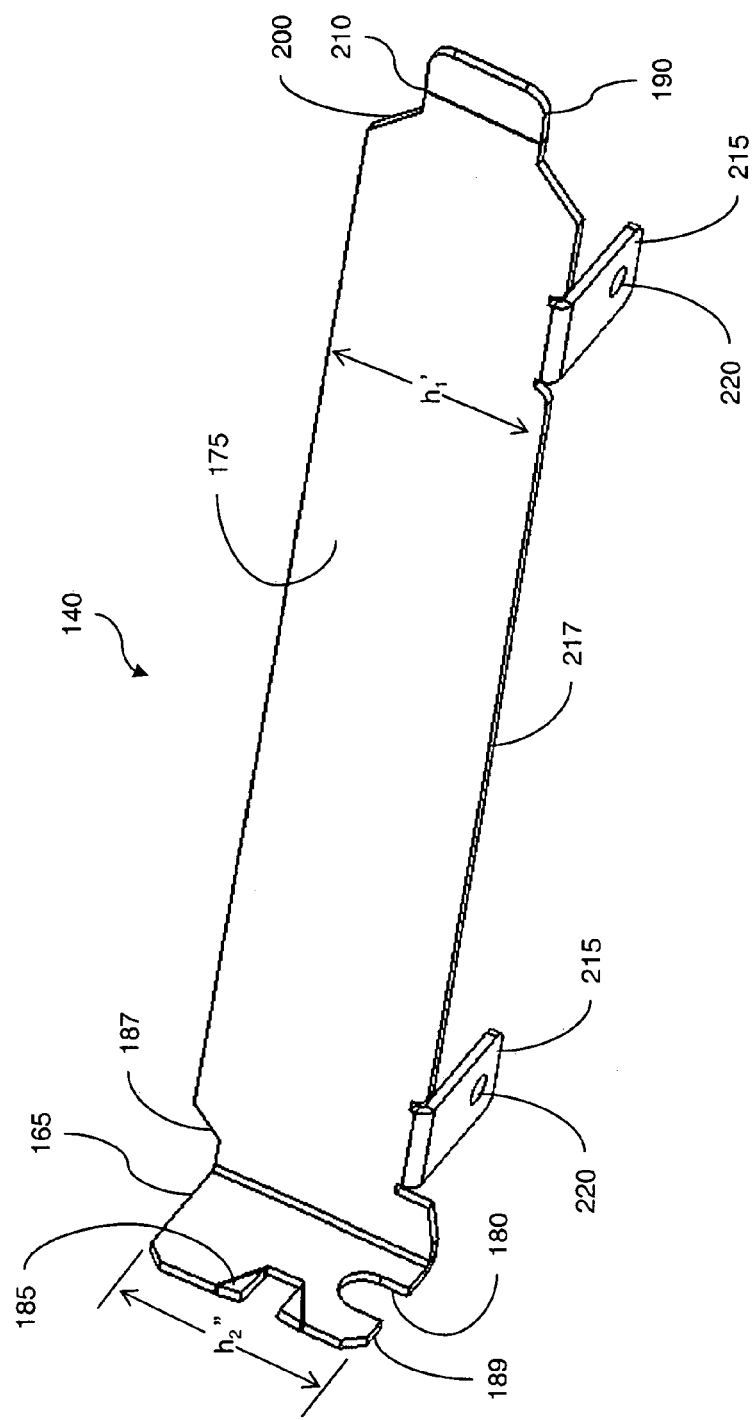
FIG. 3 is a more detailed perspective view of the mounting bracket of FIG. 3.

FIG. 3 shows a more detailed perspective view of the mounting bracket 140. The mounting bracket 140 is an elongated structure including the angled flange 165 positioned at one end and an anchoring tab 190 at the other end. The angled flange 165 extends outward in a substantially perpendicular direction away from an external surface 175 of the mounting bracket (i.e., away from the printed circuit board 132 shown in FIG. 2).

The angled flange 165 includes a notch 180 along one edge and a raised bur 185 along another edge. The notch 180 is generally used to fasten one end of the mounting bracket 140 to another structure with a screw. The raised bur 185 is adapted to abut an adjoining surface and to be driven into the adjoining surface when fastened thereto. Thus, the bur 185 can breach a non-conducting layer resulting from oxidation, paint, grease, or other impurities to promote a reliable electrically conductive contact.

The height $h_2$" of the angled flange 165 may be equal to the height $h_1$" of the elongated external surface 175. The end of the mounting bracket 140 including the angled flange 165, however, includes an offset 187, such that a bottom edge 189 of the angled flange 165 protrudes below the bottom edge 217 of the external surface 175.

The anchoring tab 190 includes a narrowed region formed through a taper 200. A bend 210 formed at its base causes the anchoring tab 190 to extend away from the plane of the external surface 175 at a slight angle (e.g., between about 5° and 10°). This bend 210 facilitates insertion and removal of the expansion board assembly 110 from the electronics enclosure 100 (FIG. 1) and also improves the reliability of an electrically conductive contact between the anchoring tab 190 and the front panel 130, when installed.

The mounting bracket 140 also includes two board-mounting flanges 215 disposed toward each end of the mounting bracket 140 and coupled thereto along the bottom edge 217. Each of the board-mounting flanges 215 extends inward, in a substantially perpendicular direction opposite to the external surface 175 (i.e., toward the printed circuit board 132 shown in FIG. 2). The board-mounting flanges 215 each include a mounting hole 220 through which a fastener can be used to fixedly attach the mounting bracket 140 to an outer edge of the printed circuit board 132 (FIG. 2).

FIG. 4A shows an exterior view of the front panel 130. The shape of the front panel 130 is generally rectangular with its width being substantially greater than its height. The terms height and width are used in a relative manner and not intended to suggest any particular orientation of the electronics enclosure 100 (FIG. 1). One prominent feature of the front panel 130 is the elongated, generally rectangular aperture 135. The aperture 135 resides in a plane and includes a cutout 144, or enlarged region disposed at one end of the aperture 135 and extending inward therefrom for a limited distance. Two horizontal slotted holes 145 are disposed adjacent to the end of the aperture 135 having the cutout 144. The two slotted holes 145 are in vertical alignment, with one being directly above the other.

The front panel 130 also includes a vertical slotted bracket 154 disposed adjacent an opposite end of the elongated aperture 135 than the cutout 144. The slotted bracket 154 is aligned with a centerline of the elongated aperture 135. Described in more detail below, the slotted bracket 154 receives the anchoring tab 190 (FIG. 3) of the mounting bracket 140 when the expansion board assembly 110 is seated within the equipment enclosure 100.

FIG. 4B shows the front panel 130 from inside the chassis 115 (FIG. 1). The front panel 130 includes an EMI/RFI panel gasket 225 positioned about a substantial portion of the perimeter of the elongated aperture 135. The panel gasket 225 may extend about the entire periphery of the aperture 135, or include one or more gaps positioned to avoid interfering with other components. As shown, the panel gasket 225 does not include a segment along the side with the slotted holes 145. Additionally, the panel gasket 225 does not include a segment along the bottom of elongated aperture along the cutout 144. The panel gasket 225 sits between the external surface 175 of the mounting bracket 140 and the interior surface of the front panel 130 to form an EMI/RFI sealing contact therebetween.

Example materials for the panel gasket 225 include, but are not limited to, fingerstock, wire mesh, conductive fabric, conductive fabric over foam, conductive elastomers, conductive-coated elastomers, conductive foil wrapped foam, low ESR/ESL material, and combinations thereof. The panel gasket 225 may be attached to an interior surface of the front panel 130 using mechanical fasteners (e.g., screws or clips), chemical fasteners (e.g., conductive tapes or adhesives), thermal bonding, soldering, welding and any combination thereof. In some embodiments, the panel gasket 225 may be formed in place. Whichever method of attachment is used, electrically conductive contact is maintained between the panel gasket 225 and the interior surface of the front panel.

Figure 5B:
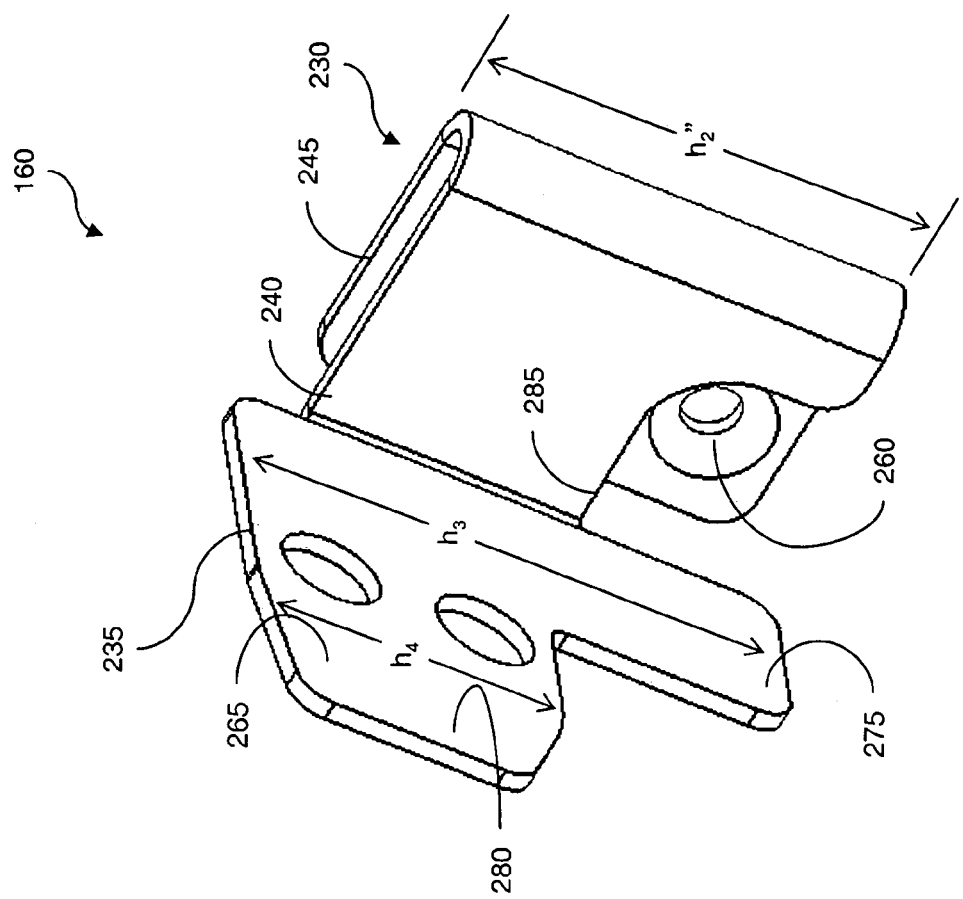
FIG. 5A, FIG. 5B, and FIG. 5C are different perspective views of the EMI/RFI shield extension of FIG. 1.
Figure 5A:
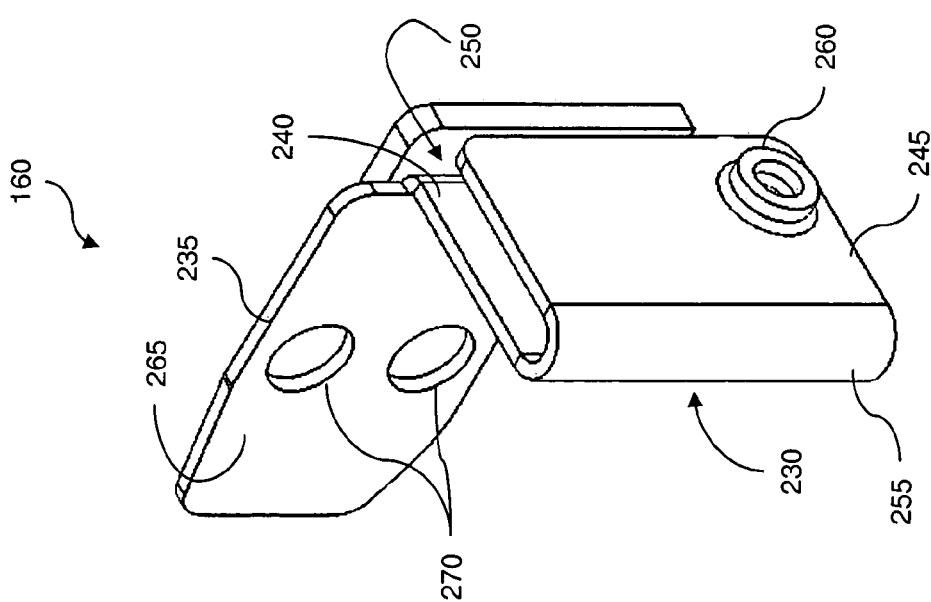

FIG. 5A shows a front perspective view of the EMI/RFI shield extension 160 formed from an electrically conductive material and including a flange receptacle 230 coupled to a planer shielding plate 235. The flange receptacle 230 extends substantially perpendicular from the plane of the shielding plate 235.

The flange receptacle 230 includes a first wall 240 abutting one end of the shielding plate 235 and an adjacent, overlapping second wall 245. A channel is formed between the two overlapping walls 240, 245, the channel being accessible through a slotted aperture at an open end 250. The channel is narrow, being dimensioned to receive the angled flange 165 (FIG. 3), while allowing some dimensional tolerance to avoid interference between the angled flange 165 and the overlapping walls 240, 245. The two walls 240, 245 join at a closed end 255, opposite the open end 250. In some embodiments, the closed end 255 is formed by a bend when a single sheet of material (e.g., sheet metal) is bent to form the overlapping walls 240, 245.

In addition, the flange receptacle 230 includes a threaded bore 260 disposed on the second wall 245. The threaded bore 260 receives a fastener (i.e., screw) to secure the angled flange 165 (FIG. 3) when inserted within the flange receptacle 230. The threaded bore 260 is positioned for alignment with the notch 180 (FIG. 3) of the angled flange 165 when inserted into the open end 250 of the flange receptacle 230.

For the exemplary PCI form-factor embodiment, the threaded bore 260 accepts a 6×32 bracket mounting screw (not shown). The bracket-mounting screw, when tightened securely fastens the shield extension 160 to the mounting bracket 140. The bur 185 (FIG. 3) is driven into an interior surface of the second wall 245. The flange receptacle 230 is sized and positioned such that the external surface 175 (FIG. 3) of the mounting bracket 140 is substantially in planar alignment with a front surface 265 of the shielding plate 235.

Referring now to FIG. 5B, a cutout 285 is provided in the first wall 240 and aligned with the threaded bore 260. The cutout 285 enables access to a fastener inserted into the threaded bore 260 from a lateral direction. For example, a screwdriver positioned parallel to the front surface 265 accesses a head of a mounting screw through the cutout 285. The mounting screw thus fastens the angled flange 165 to the flange receptacle 230.

Disposed within the shielding plate 235 are two circular panel-mounting apertures 270, one aperture 270 above the other. The front surface 265 includes a first region 275 disposed between the panel-mounting apertures 270 and the first wall 240 of the flange receptacle 230 and a second region 280 disposed on an opposite side of the panel-mounting apertures 270.

The height $h_3$ of the first region is dimensioned to be greater than the height $h_2$ (FIG. 4A) of the elongated aperture 135 along the cutout 144 region. Thus, the second region 280 will overlap the elongated aperture 135 when positioned against the front panel 130. The height $h_4$ of the second region 280 is dimensioned to be greater than the outer distance between the perimeters of the panel-mounting apertures 270. For the exemplary configuration, the height $h_4$ of the second region 280 is less than the height $h_3$ of the first region 275.

Figure 5C:
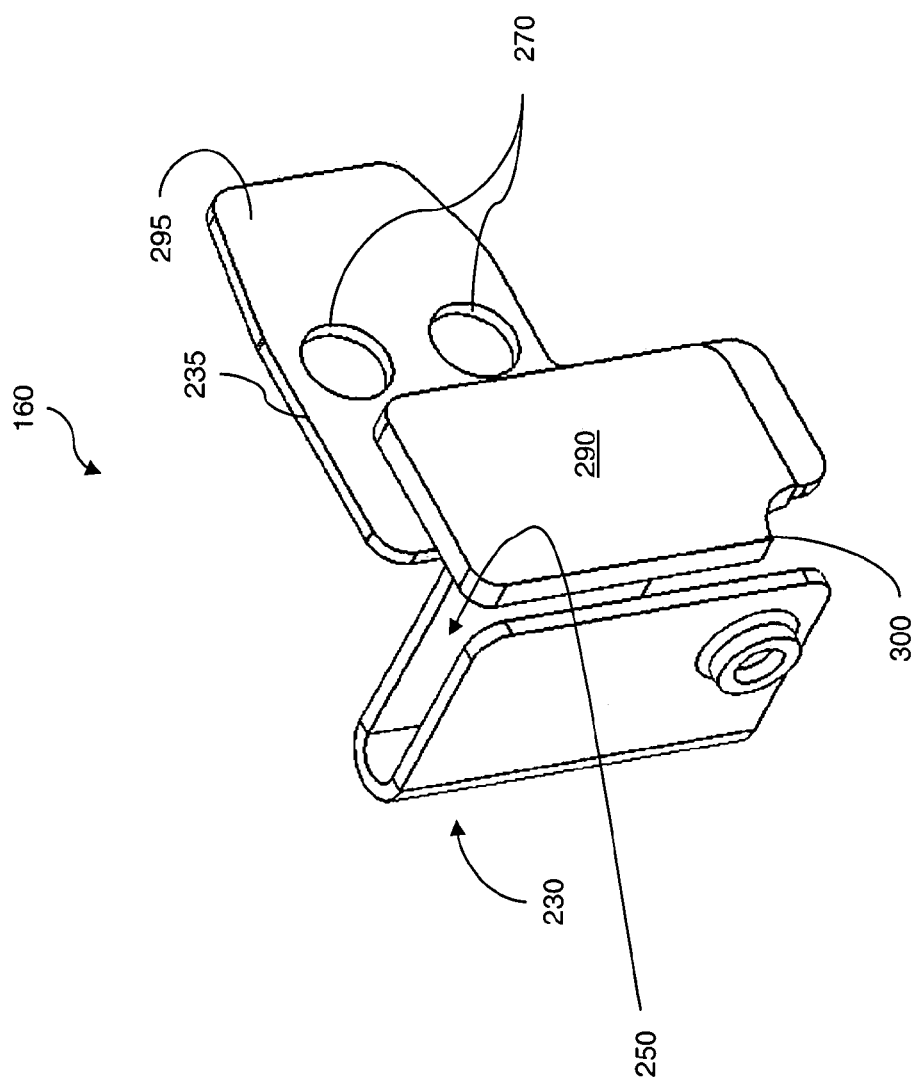

FIG. 5C shows a rear perspective view of the shield extension 160 including an EMI/RFI gasket 290. The EMI/RFI gasket 290 prevents an unwanted gap occurring at the interconnection of the angled flange 165 to the flange receptacle 230. The EMI/RFI gasket 290 includes a planar member coupled to a rear surface 295 of the shielding plate 235. One edge 300 of the EMI/RFI gasket 290 protrudes inward from the shielding plate 235 toward the flange receptacle 230 and positioned to block entry partially into the channel of the flange receptacle 230. The EMI/RFI gasket 290 is preferably compliant (i.e., deformable) to permit insertion and extraction of the angled flange 165 from the flange receptacle 230.

In use, the overlapping edge 300 of the EMI/RFI gasket 290 flexes to allow the angled flange 165 to enter into and exit from the open end 250. The overlapping edge 300 of the EMI/RFI gasket 290 is also positioned to remain in electrical contact with the mounting bracket 140, thereby sealing any gap between the mounting bracket 140 and the shield extension 160 coupled thereto.

The EMI/RFI gasket 290 can made of any one of the gasket materials described herein. The portion of the EMI/RFI gasket 290 overlapping the rear surface 295 is fastened thereto using any of the fastening means for attaching a gasket described herein.

Figure 6:
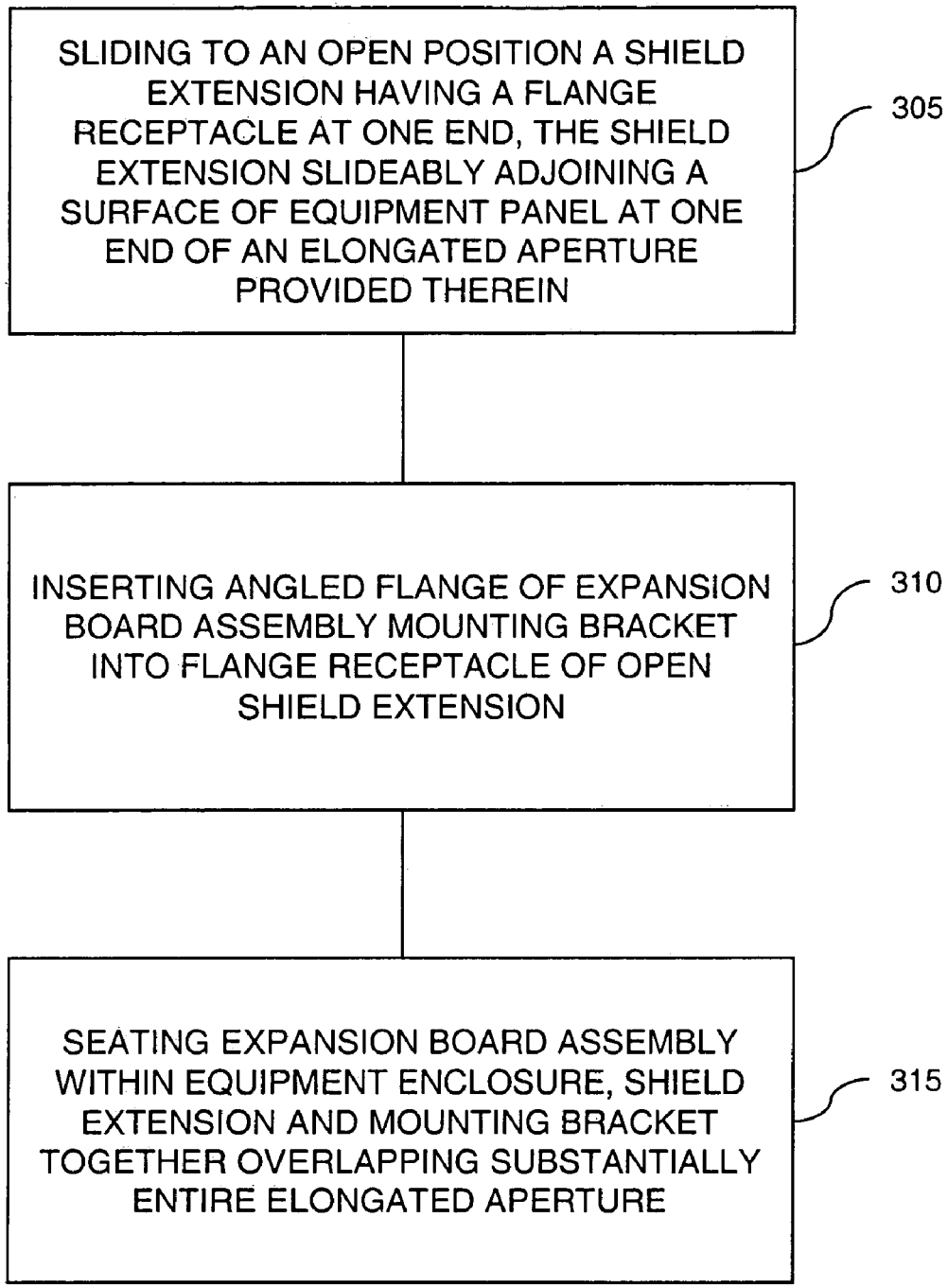
FIG. 6 is a flow diagram of an exemplary procedure for inserting the expansion board assembly of FIG. 2 into the electronics enclosure of FIG. 1.
Figure 8A:
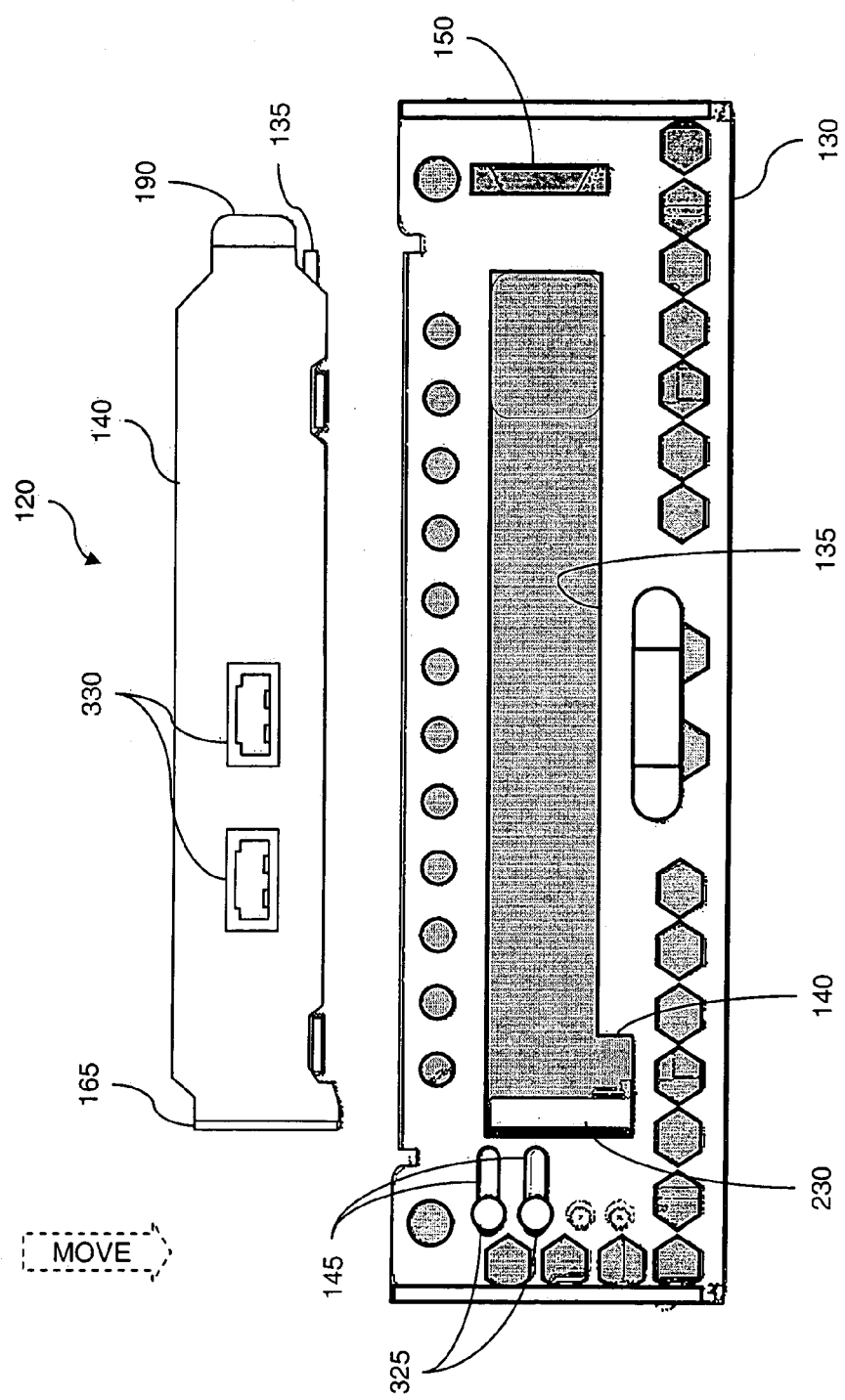
FIG. 8A, FIG. 8B, and FIG. 8C provide a sequence of front views of a portion of the front panel of FIG. 4A illustrating the relative positions and motions of the different components during insertion of the expansion board assembly into the electronics enclosure of FIG. 1.
Figure 8B:
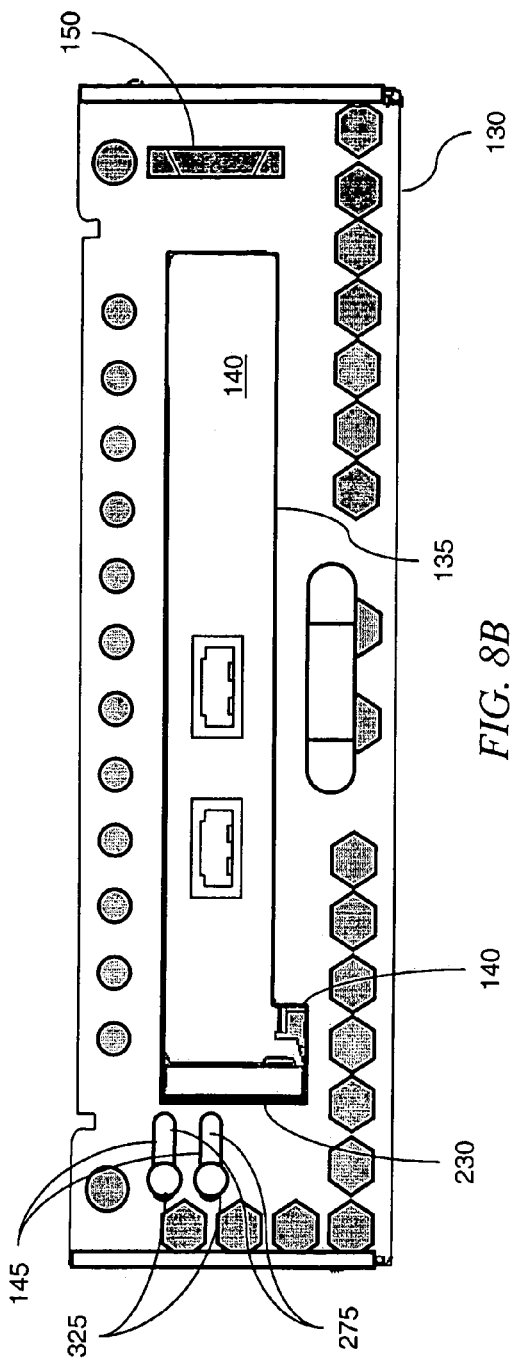
Figure 8C:
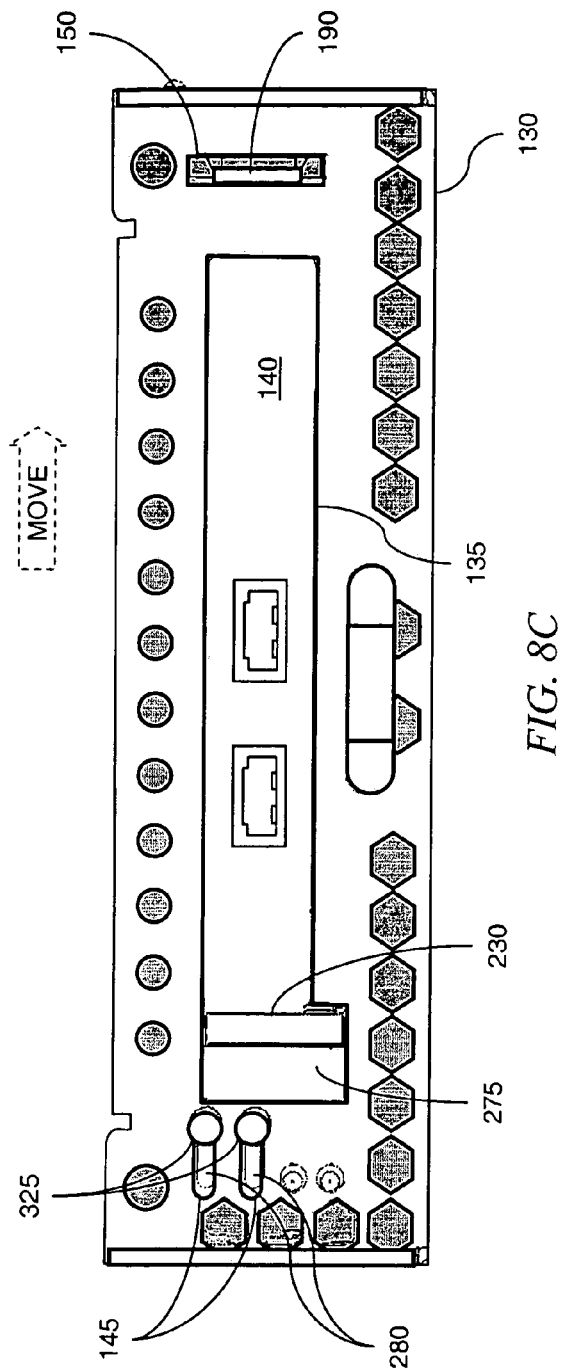

FIG. 6 provides a flow diagram of an exemplary process for inserting the expansion board assembly of FIG. 3 into the electronics enclosure of FIG. 1. The description of the process refers to FIG. 7A, FIG. 7B, and FIG. 7C, showing a sequence of top views illustrating the installation process, and to FIG. 8A, FIG. 8B, and FIG. 8C, showing a sequence of front views also illustrating the insertion process.

The insertion process requires that the top panel of the chassis 115 be removed to provide access to the host circuit board 105. The process includes first sliding the shield extension 160 to an open position (Step 305). Referring to FIG. 8A showing a front view of the front panel 130, the flange receptacle 230 is illustrated in an open position, disposed at a left end of the elongated aperture 135. Not visible is the shielding plate 235 (FIG. 5A), because it is hidden by the left end of the front panel 130. In the exemplary embodiment, the shield extension 160 slidably adjoins an interior surface of the front panel 130. Thus, the front surface 265 (FIG. 5A) of the shield extension 160 abuts the interior surface of the front panel 130.

Alignment members 325 (e.g., alignment screws, alignment pins) extend through the slotted holes 145 provided adjacent to the left end of the elongated aperture 135. The alignment members 325 slidably couple the shield extension 160 to the front panel 130 using cinch-type fasteners (not shown). The alignment members 325 can be loosely fastened permitting the shield extension 160 to slide from side to side, guided by the slotted holes 145. The alignment members 325 can be tightened to secure the shield extension 160 to the front panel 130.

The expansion board assembly 110 is positioned above the top of the open chassis 115 in parallel alignment with the host circuit board 105. In particular, the angled flange 165 of the mounting bracket 140 is positioned directly above the flange receptacle 230. (In FIG. 8A, the mounting bracket 140 includes a plurality of communication ports 330.)

Referring now to FIG. 7A showing a top view of the configuration illustrated in FIG. 8A, the outer end of finger connector 150 is positioned to the left of the expansion slot 155. Additionally, the mounting bracket 140 is positioned sufficiently behind the interior surface of the front panel (the interior surface of the front panel 130 being illustrated by a phantom reference line 320) such that the protruding end of the angled flange 165 is disposed behind the open end 250 of the shield extension 160. (Also shown is the EMI/RFI gasket 290 with its overlapping edge at least partially blocking access to the open end 250.)

The elongated aperture 135 (FIG. 8A) and the shield extension 160 are dimensioned such that alignment of the angled flange 165 with the open end 250 ensures that the finger connector 150 does not interfere with the expansion slot 155 when the printed circuit board 132 is lowered into the chassis 115.

A second step in the insertion process of FIG. 6 is inserting the angled flange 165 of the mounting bracket 140 into the flange receptacle 230 of the shield extension 160 in the open position (Step 310). Referring to FIG. 8B, the expansion board assembly 110 is shown lowered into the chassis 115, such that the mounting bracket 140 is positioned into overlapping alignment with the elongated aperture 135 of the front panel 130. Care must be exercised to ensure that the angled flange remains in alignment with the open end 250 (FIG. 7B) of the flange receptacle 230.

Referring to FIG. 7B, the expansion board assembly 110, now lowered into the chassis 115, is moved forward toward the interior surface of the front panel 130 as indicated by the arrow, shown in phantom. The forward movement drives the angled flange 165 into the open end 250 of the flange receptacle 230. The depth of the channel provided by the flange receptacle 230 is sufficient to adjoin an overlapping edge of the external surface 175 of the mounting bracket 140 to the interior surface of the front panel 130. To the extent that an EMI/RFI panel gasket 225 (FIG. 4B) is present, the outer edge of the external surface 175 of the mounting bracket 140 abuts the EMI/RFI panel gasket 225, sandwiching the panel gasket 225 between the mounting bracket 140 and the front panel 130. Now, the printed circuit board 132 resides in a plane parallel to the host circuit board 105, such that the finger connector 150 is in proper alignment with the expansion slot 155.

The next step in the installation process of FIG. 6 includes "seating" the expansion board assembly 110 within the electronics enclosure (Step 315). Referring to FIG. 7C, the expansion board assembly 110, now coupled to the shield extension 160 and having its finger connector 150 aligned in front of the expansion slot 155, is urged toward the expansion slot 155 (i.e., toward the right as indicated by the arrow shown in phantom). Movement in this direction continues until the finger connector 150 is fully seated within the expansion slot 155. As illustrated, the mounting bracket 140 and shield extension 160 remain adjoining the interior surface of the front panel 130.

Referring now to FIG. 8C, movement of the expansion board assembly 110 to the right as described above, urges the anchoring tab 190 of the mounting bracket 140 into the slotted bracket 154. This provides mechanical support to vertical forces applied to the finger connector 150 side of the printed circuit board 132. Additionally, the bend 210 (FIG. 3) urges the outer end of the anchoring tab 190 against the interior surface of the front panel 130 to promote a reliable electrical connection.

Movement of the expansion board assembly 110 also urges the shield extension 160 to the right (i.e., to the closed position). The angled flange 165 being retained with the flange receptacle 230 causes the shield extension to move in a lateral direction along the surface of the front panel 130, corresponding to movement of the expansion board assembly 110. Movement of the shield extension 160 toward its closed position reveals a portion of the shielding plate 235. In particular, an adjustable portion of the first region 275 is visible at the left end of the elongated aperture 135, between the flange receptacle 230 and the left edge of the aperture.

The alignment members 325 holding the front surface 265 of the shielding plate 235 against the interior surface of the front panel 130 maintain the shield extension 160 in planar alignment with, and abutting the interior surface of the front panel 130. After the printed circuit board 132 is seated, the alignment members 325 can be adjusted to fasten the shield extension 160 securely to the interior surface of the front panel 130. So fastened, the flange receptacle 230 provides a firm anchoring point for the angled flange 165 of the mounting bracket 140. A fastening screw can be inserted, as described above in relation to FIG. 5B, to secure the angled flange 165 to the shield extension 160, the mounting bracket 140 together with the shield extension 160 substantially covering the entire elongated aperture 135.

Additionally, the second region 280 of the shielding plate 235 extends along the interior surface of the front panel 130 to cover any remaining apertures due to the slotted holes 145. Accordingly, integrity of the EMI/RFI shield is maintained with a PCI-style expansion board assembly in an electronics enclosure having an exterior panel with an elongated aperture 135 for accommodating the mounting bracket of that expansion board assembly.

While the invention has been shown and described with reference to specific preferred embodiments, it should be understood by those skilled in the art that various changes in form and detail may be made therein without departing from the spirit and scope of the invention as defined by the following claims.

What is claimed is:

1. An electronics enclosure comprising:
   an electrically conductive exterior panel having an elongated aperture formed therein;
   an expansion board assembly with a mounting bracket coupled to the exterior panel to cover a first portion of the elongated aperture, the coupled mounting bracket having an angled flange protruding through the elongated aperture;
   an electrically conductive shield extension having a flange receptacle and a shielding plate extending from one end of the flange receptacle, the shield extension being coupled to the mounting bracket with the flange receptacle receiving the angled flange and with the shielding plate covering a second portion of the elongated aperture, wherein the mounting bracket and shield extension fully cover the elongated aperture in the exterior panel of the electronics enclosure.

2. The electronics enclosure of claim 1, wherein the shield extension includes an electromagnetic interference/radio frequency interference (EMI/RFI) gasket disposed at an opening of the flange receptacle for making electrically conductive contact with the angled flange when the angled flange is inserted into the flange receptacle.

3. The electronics enclosure of claim 2, wherein the EMI/RFI gasket is compliant so that one end of the EMI/RFI gasket bends and enters the flange receptacle after making electrically conductive contact with the angled flange when the angled flange is inserted into the flange receptacle.

4. The electronics enclosure of claim 1, wherein the exterior panel has at least one slotted aperture and the shielding plate at least one panel-mounting aperture, and further comprising an alignment member extending through the slotted aperture and the panel-mounting aperture to join the shielding plate slidably to the exterior panel.

5. The electronics enclosure of claim 1, further comprising an EMI/RFI panel gasket disposed around at least a portion of a perimeter of the elongated aperture, between an interior surface of the exterior panel and an overlapping perimeter of the mounting bracket.

6. The electronics enclosure of claim 1, wherein the exterior panel has an interior surface with a raised slotted bracket and the mounting bracket has one end with an anchoring tab, the anchoring tab sliding into the raised slotted bracket when the mounting bracket is coupled to the exterior panel.

7. The electronics enclosure of claim 1, wherein the angled flange has a notch and the flange receptacle has a threaded bore that aligns with the notch when the flange receptacle receives the angled flange, and further comprising an fastener extending through the notch and threaded bore to couple the angled flange to the flange receptacle.

8. The electronics enclosure of claim 1, wherein the flange receptacle has a plurality of opposing walls, the opposing walls being joined at one end and defining a channel into which to receive the angled flange.

9. The electronics enclosure of claim 1, wherein the shielding plate extends substantially perpendicularly from one wall of the flange receptacle.

10. The electronics enclosure of claim 1, wherein the angled flange has a raised bur for making electrically conductive contact to an electrically conductive surface of the flange receptacle when the flange receptacle receives the angled flange.

11. The electronics enclosure of claim 1, wherein the mounting bracket conforms to a standardized form factor.

12. The electronics enclosure of claim 11, wherein the standardized form factor is the Peripheral Component Interface (PCI) form factor.

13. An adaptable electromagnetic interference/radio frequency interference (EMI/RFI) shield comprising:
    a mounting bracket dimensioned to cover a first portion of an elongated aperture in an exterior panel of an electronics enclosure, the mounting bracket having an angled flange protruding through the elongated aperture when the mounting bracket is coupled to the exterior panel; and
    an electrically conductive shield extension having a flange receptacle and a shielding plate extending from one end of the flange receptacle, the shield extension being coupled to the mounting bracket with the flange receptacle receiving the angled flange, the shielding plate dimensioned to cover a second portion of the elongated aperture so that the mounting bracket and shield extension fully cover the elongated aperture in the exterior panel of the electronics enclosure aperture when the mounting bracket is coupled to the exterior panel.

14. The EMI/RFI shield of claim 13, wherein the shield extension includes an EMI/RFI gasket disposed at an opening of the flange receptacle for making electrically conductive contact with the angled flange when the angled flange is inserted into the flange receptacle.

15. The EMI/RFI shield of claim 13, wherein the flange receptacle has a plurality of opposing walls, the opposing walls being joined at one end and defining a channel into which to receive the angled flange of the mounting bracket.

16. The EMI/RFI shield of claim 13, wherein the shielding plate extends substantially perpendicularly from one wall of the flange receptacle.

17. The EMI/RFI shield of claim 13, wherein the mounting bracket conforms to a Peripheral Component Interface (PCI) form factor.

18. A method for installing an expansion board assembly into an electromagnetic interference/radio frequency interference (EMI/RFI) shielded electronics enclosure, the method comprising:
    coupling a flange receptacle of a EMI/RFI shield extension to an angled flange of a mounting bracket that extends along an edge of the expansion board assembly;

slidably coupling the EMI/RFI shield extension and the mounting bracket to an exterior panel of the electronics enclosure such that the flange receptacle and angled flange protrude through an elongated aperture in the exterior panel;

sliding the EMI/RFI shield extension and mounting bracket along a length of the exterior panel until a connector on the electronic board assembly mates with a connector in the electronics enclosure, wherein when the connectors mate, the mounting bracket and the EMI/RFI shield extension substantially cover the elongated aperture in the exterior panel.

19. The method of claim 18, wherein the EMI/RFI shield extension includes a flange receptacle and further comprising the steps of inserting the angled flange into the flange receptacle and securely fastening the angled flange to the flange receptacle.

20. The method of claim 18, further comprising the step of tightly fastening the EMI/RFI shield extension to the exterior panel after the connectors mate and the mounting bracket and the EMI/RFI shield extension substantially cover the elongated aperture in the exterior panel.

* * * * *